C. L. SMITH.
TIRE RIVETING TOOL.
APPLICATION FILED JUNE 7, 1917.

1,261,309.

Patented Apr. 2, 1918.

Inventor

C. L. SMITH

By  H. S. Hill

Attorney

UNITED STATES PATENT OFFICE.

CHARLIE LEE SMITH, OF JACKSON, MISSISSIPPI.

TIRE-RIVETING TOOL.

1,261,309.                Specification of Letters Patent.        Patented Apr. 2, 1918.

Application filed June 7, 1917.   Serial No. 173,299.

*To all whom it may concern:*

Be it known that I, CHARLIE LEE SMITH, a citizen of the United States, residing at Jackson, in the county of Hinds, State of Mississippi, have invented a new and useful Tire-Riveting Tool; and I do hereby declare the following to be a full, clear, and exact description of the invention, such as will enable others skilled in the art to which it appertains to make and use the same.

The present invention relates to a tire riveting tool, and has for its object to provide a device of this character which embodies novel features of construction whereby two worn tire casings can be easily fastened together by rivets in such a manner as to form a single rebuilt tire casing from which a large amount of additional mileage can be obtained.

Further objects of the invention are to provide a tire riveting tool of this character which is comparatively simple and inexpensive in its construction, which can be manually operated without difficulty, which can be easily applied to the tire casings after they have been properly prepared and assembled, and which is not liable to break or get out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views of the drawings by the same reference characters.

Figure 1:
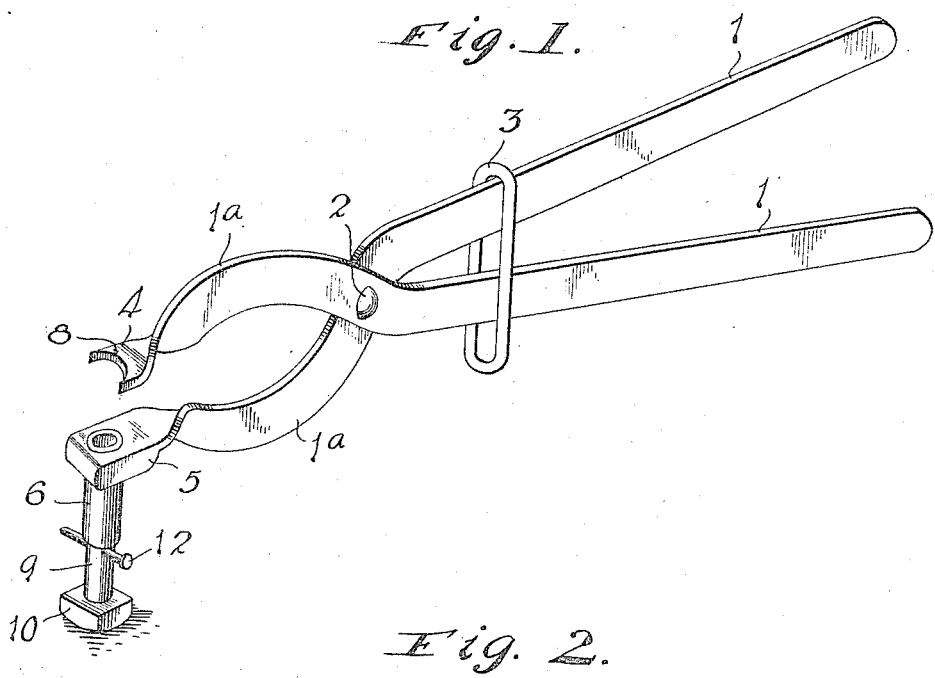
Figure 1 is a perspective view of a tire riveting tool constructed in accordance with the invention.
Figure 2:
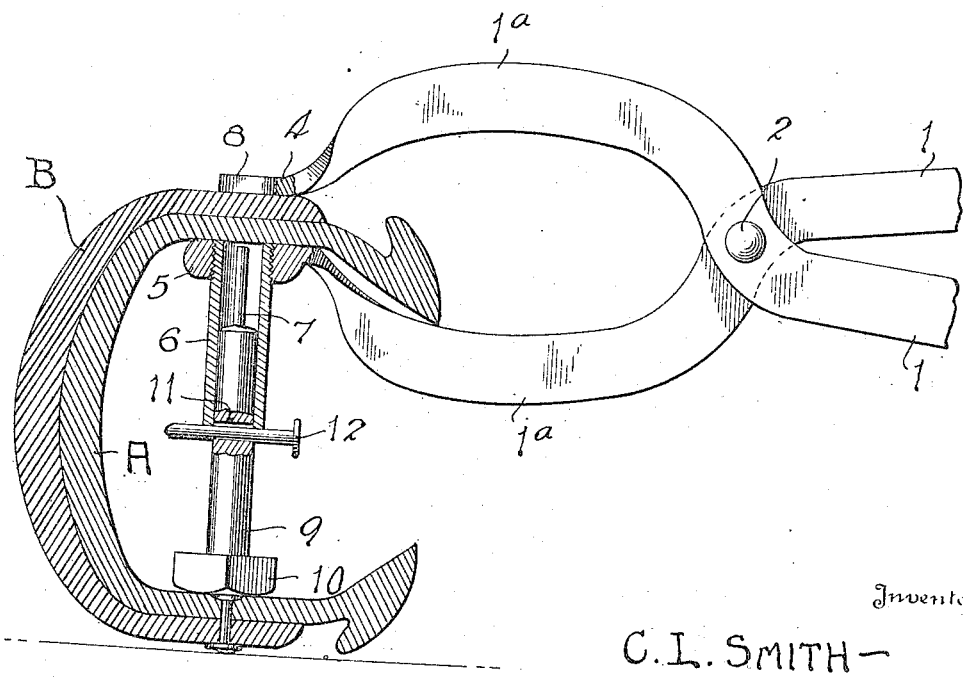
Fig. 2 is an enlarged side elevation of the jaws of the tool, portions being broken away and shown in section, a pair of tires to be riveted together being shown as clamped between the jaws.

Specifically describing the present embodiment of the invention, the numerals 1 designate a pair of similar and complemental operating levers, said levers being preferably formed of flat bars which cross toward their forward ends and are pivotally connected at 2. The rear ends or handle portions of the operating levers 1 are arranged so that the straight outer edges thereof will flare outwardly when the handles are brought together, and a locking slide 3 is fitted upon the handles. When this locking slide 3 is moved forwardly toward the pivotal connection 2 the handle ends of the operating levers can be swung apart, while when the locking slide is moved rearwardly and brought into a binding engagement with the flared outer edges of the handles the handles are locked in a closed position.

The forward ends $1^a$ of the operating levers are reversely arched or curved and terminate in the respective jaws 4 and 5, said jaws being flat and adapted to clamp the tire carcasses between the same when the device is in use. The lower jaw 5 is in the form of a head which has an opening therein, the upper end of a rivet guide tube 6 which is pendent from the jaw being screwed into the said opening. This rivet guide 6 has an inner diameter just slightly larger than the head of the rivets 7 which are to be used in fastening the tire carcasses together, so that the rivets can pass freely through the rivet guide, although they are held in proper position thereby. The upper jaw 4 only extends partially over the head or lower jaw 5, and the end thereof is notched at 8 to leave the opening through the rivet guide 6 entirely unobstructed, even when the jaws are closed.

The tire carcasses which are to be riveted together are indicated by the characters A and B, the beads of the outer carcass B having been previously removed in the usual manner. The edge portions of the outer tire carcass B are to be secured at intervals by the rivets 7 to the inner carcass A. The properly assembled tires are placed upon a flat horizontal surface and the carcasses gripped at a point where it is desired to insert a rivet between the jaws 4 and 5 of the tool, the jaw 5 with the rivet guide 6 projecting therefrom being arranged within the interior of the tire carcasses. A rivet 7 is next inserted into the rivet guide 6, after which a plunger 9 is inserted in the said guide, said plunger being provided at its outer end with a head 10, and being formed with a transverse opening 11 within which a removable pin 12 is initially inserted. This pin 12 engages the outer end of the rivet guide 6 to limit the inward movement of the plunger and prevent the plunger from forcing the rivet 7 against the carcass A until everything is ready for the riveting operation. The tool is next brought into a substantially horizontal position with the head 10 of the plunger 9 resting squarely upon the horizontal supporting surface, after which the pin 12 is slipped from position and the outer face of the carcass B tapped slightly with a hammer or similar tool. This will cause the rivet 7 to penetrate the two carcasses A and B and project outwardly beyond the latter. The washer 13 may then be placed upon the projecting end of the rivet 7 and the usual appliances used for cutting off the end of the rivet and upsetting the same. By the use of this tool the rivets can be very quickly applied to the tire carcasses at the desired intervals for fastening them together. During the riveting operation the jaws 4 and 5 are maintained in a firm engagement with the tire by means of the locking slide 3 which was moved outwardly upon the flared handle ends of the operating levers 1. Preparatory to releasing the tool and applying it to the tire carcasses in another position the locking slide 3 is moved forwardly upon the handles toward the pivot point 2.

Having thus described the invention, what I claim as new and desire to secure by Letters Patent, is:—

1. A tire riveting tool including a pair of pivotally connected operating levers terminating in opposed jaws adapted to grip a tire carcass between them, a rivet guide tube carried by one of the jaws and pendent therefrom, said guide tube opening through the gripping face of the jaw, and a driving plunger slidable within the guide tube for engagement with the head of a rivet which is to be forced through the tire carcass gripped between the jaws.

2. A tire riveting tool including a pair of pivotally connected complemental operating levers terminating in opposed jaws adapted to grip the carcass of a tire between them, one of the jaws being notched, a rivet guide tube projecting rearwardly from the opposite jaw and opening through the face thereof, the notched portion of the first mentioned jaw leaving the passage through the rivet guide tube entirely unobstructed, and a driving plunger slidable within the outer end of the rivet guide tube for engagement with the head of a rivet which is to be forced through the tire carcass.

3. A tire riveting tool including pivotally connected complemental operating levers terminating in opposed jaws adapted to grip a tire carcass between the same, a rivet guide tube projecting from the back of one of the jaws and opening through the gripping face thereof, a driving plunger slidable within the outer end of the guide tube and terminating in a head adapted to rest upon a solid support, the inner end of the plunger being adapted to engage the head of a rivet which is to be forced through the tire carcass, and a removable stop pin initially applied to the plunger to limit the inward movement thereof until the tool is in working position.

4. A tire riveting tool including a pair of pivotally connected complemental operating levers terminating in opposed jaws adapted to grip a tire carcass, one of said jaws having the end thereof notched, a rivet guide tube projecting from the back of the opposite jaw and opening through the gripping face, thereof, the notched portion of the first mentioned jaw leaving the bore of the rivet guide tube entirely unobstructed, a driving plunger slidable within the outer end of the rivet guide tube and terminating in a head adapted to rest upon a solid support, said plunger being formed with a transverse opening and the inner end thereof being adapted to engage the head of a rivet to be driven through the tire carcass, and a pin removably inserted through the transverse opening of the plunger for engagement with the end of the rivet guide tube to limit the inward movement of the plunger until the tool is in working position.

5. A tire riveting tool including a pair of pivotally connected operating levers terminating at one end in opposed jaws adapted to grip a tire and at the other end in flared handle portions, one of the jaws having a notched end, a rivet guide tube projecting from the back of the opposite jaw and opening through the gripping face thereof, the notched portion of the first mentioned jaw leaving the opening of the rivet guide tube entirely unobstructed, a locking slide mounted upon the handle ends of the operating levers and coöperating therewith to hold the jaws in gripping position, and a driving plunger slidably mounted within the outer end of the rivet guide tube and terminating in a head adapted to rest upon a solid support, the inner end of the plunger being adapted to engage the head of a rivet to be driven through the tire carcass.

In testimony whereof I have signed my name to this specification in the presence of two subscribing witnesses.

CHARLIE LEE SMITH.

Witnesses:
 CHARLIE C. SCOTT,
 H. C. SMITH.

Copies of this patent may be obtained for five cents each, by addressing the "Commissioner of Patents, Washington, D. C."